United States Patent [19]
Marchbank et al.

[11] Patent Number: 5,536,297
[45] Date of Patent: Jul. 16, 1996

[54] GOLD RECOVERY FROM REFRACTORY CARBONACEOUS ORES BY PRESSURE OXIDATION AND THIOSULFATE LEACHING

[75] Inventors: Andrew R. Marchbank, Oakville; Kenneth G. Thomas, Mississauga; David Dreisinger, Delta; Christopher Fleming, Peterborough, all of Canada

[73] Assignee: Barrick Gold Corporation, Toronto, Canada

[21] Appl. No.: 389,016

[22] Filed: Feb. 10, 1995

[51] Int. Cl.$^6$ ............................................. C22B 3/46
[52] U.S. Cl. ............................................. 75/736; 75/744
[58] Field of Search .................................... 75/736, 744

[56] References Cited

U.S. PATENT DOCUMENTS

| | | | |
|---|---|---|---|
| 4,070,182 | 1/1978 | Berezowsky et al. | 75/103 |
| 4,269,622 | 5/1981 | Kerley, Jr. | 75/103 |
| 4,369,061 | 1/1983 | Kerley, Jr. | 75/103 |
| 4,384,889 | 5/1983 | Wiewiorowski et al. | 75/736 |
| 4,552,589 | 11/1985 | Mason et al. | 75/105 |
| 4,654,078 | 3/1987 | Perez et al. | 75/118 |
| 4,723,998 | 2/1988 | O'Neil | 75/101 |
| 4,738,718 | 4/1988 | Bakshani et al. | 75/105 |
| 4,765,827 | 8/1988 | Clough et al. | 75/2 |
| 4,801,329 | 1/1989 | Clough et al. | 75/97 |
| 4,816,235 | 3/1989 | Pesic | 423/32 |
| 4,902,345 | 2/1990 | Ball et al. | 75/118 |
| 4,923,510 | 5/1990 | Ramadorai et al. | 423/29 |
| 4,925,485 | 5/1990 | Schulze | 423/22 |
| 5,071,477 | 12/1991 | Thomas et al. | 75/744 |
| 5,127,942 | 7/1992 | Breirley et al. | 75/743 |
| 5,215,575 | 6/1993 | Butler | 75/744 |
| 5,236,492 | 8/1993 | Shaw et al. | 75/744 |
| 5,354,359 | 10/1994 | Wan et al. | 75/744 |

FOREIGN PATENT DOCUMENTS

| | | |
|---|---|---|
| WO91/11539 | 8/1991 | WIPO . |
| WO94/06944 | 3/1994 | WIPO . |

OTHER PUBLICATIONS

Berezowsky et al., Recovery of Gold and Silver from Oxidation Leach Residues by Ammonicacal Thioslfate Leaching, AIME Meeting, Feb. 18–22, 1979, pp. 1–17.

Tozawa et al., Dissolution of Gold in Amoniacal Thiosulfate Solution, AIME/TMS, 1981, pp. 1–12.

Zipperian et al., Gold and Silver Extraction by Ammoniacal Thiosulfate Leaching from a Rhyolite Ore, Huydrometallurgy, 19, 1988, pp. 361–375.

Hemmati et al., Study of the Thiosulfate Leaching of Gold from Carbonaceous Ore and the Quantitative Determination of Thiosulfate in the Leached Solution; Extraction Metallurgy 1988 Symp., Inst. Min. Metall., London, 1989, pp. 665–678.

Gallagher et al., Affinity of Activated Carbon Towards Some Some Gold (I) Complexes, Hydrometallurgy, 25, 1990, pp. 305–316.

Langhans et al., Copper–catalyzed Thiosulfate Leaching of Lowgrade Gold Ores, Hydrometallurgy, 29, Jun. 1992, pp. 191–203.

Wan et al., Research and Development Activities for the Recovery of Gold from NoncyAnide Solutions; Hydrometallurgy, 1993, pp. 428–431.

Thomas et al., Alkaline and Acidic Autoclaving of Refractory Gold Ores; JOM, Feb. 1991, pp. 16–19.

(List continued on next page.)

*Primary Examiner*—Melvyn Andrews
*Attorney, Agent, or Firm*—Senniger, Powers, Leavitt & Roedel

[57] ABSTRACT

A process for recovering gold in which an ore slurry of refractory sulfidic and refractory carbonaceous ore having preg-robbing characteristics due to the presence of organic carbon is subjected to pressure oxidation in an autoclave. The oxidized ore slurry is mixed with a thiosulfate salt lixiviant, which mixture is maintained at a pH between 7 and 8.7 while the slurry is agitated in a stirred tank reactor system having agitated leach tanks. Gold is recovered from the gold-bearing leachate by cementation, adsorption on an adsorbent, or cyanidation.

22 Claims, 5 Drawing Sheets

OTHER PUBLICATIONS

Gallagher, M. S. Thesis, Unviversity of Nevada–Reno, Interaction of Gold Cyanide, Thiocyanate, Thiosulfate, and Thiourea complexes, 1987, pp. i–x, 1–34.

Awadalla et al., The Recovery of Gold from Thiourea, Thiocyanate or Thiosulfate Solutions by Reduction–Precipitation with a Stabilized Form of Sodium Borohydride; Separation Science and Technology, 26(9), pp. 1207–1228, 1991.

GOLD RECOVERY FROM REFRACTORY CARBONACEOUS ORES BY PRESSURE OXIDATION AND THIOSULFATE LEACHING

BACKGROUND OF THE INVENTION

This invention relates to the recovery of gold from ores and, more particularly, to a process for the recovery of gold from refractory carbonaceous ores.

Significant quantities of gold ore currently processed in North America include substantial portions of the sulfidic minerals arsenopyrite, pyrite and marcasite. The predominant sulfide minerals in the ore contain encapsulated gold. The gold in such ores is too fine to liberate economically merely by grinding. Leachants such as cyanide and thiosulfate cannot penetrate the metal sulfide particles. This problem has been overcome by pressure oxidation as disclosed in Thomas et al. U.S. Pat. No. 5,071,477. In such processes, the refractory ores are treated by pressure oxidation to oxidize sulfide sulfur before leaching. If the sulfide sulfur is not substantially oxidized, leaching is inhibited and gold remains locked in the sulfides. By treating the ore in an aqueous slurry at elevated temperature and oxygen pressure, the sulfur is oxidized and removed from the ore. Thereafter, the gold is readily leached with a leaching agent and acceptable yields result.

Pressure oxidation is typically performed by passage of ore slurry through a multi-compartmented autoclave to which an oxygen-containing gas is continuously supplied. Pressure oxidation typically occurs under acidic conditions, as oxidation of the sulfides in the ore produce sulfuric acid in the autoclave. For certain ores, the ore slurry may be treated with sulfuric acid prior to pressure oxidation to neutralize carbonates such that the slurry fed to the autoclave is acidic. Depending on the ore, however, pressure oxidation may be best effected under alkaline conditions, as in the process disclosed in Mason et al., U.S. Pat. No. 4,552,589.

Gold is typically recovered from pressure oxidized slurries using conventional cyanidation technology. The pH of the oxidized slurry is adjusted to between 10 and 11 with lime, and cyanide is added to solubilize the gold. Oxygen is dispersed through the slurry by agitation, and gold dissolves by the following reaction:

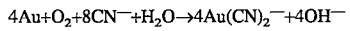

$$4Au + O_2 + 8CN^- + H_2O \rightarrow 4Au(CN)_2^- + 4OH^-$$

In modern cyanidation circuits, the dissolved gold is typically adsorbed onto particles of activated carbon, either during the cyanide leach itself by carbon-in-leach (CIL) or following the leach by carbon-in-pulp (CIP). An alternate method of recovering gold from cyanide leach solutions is through zinc cementation and variations of the Merrill-Crowe process.

In addition to the locking of gold particles in sulfide minerals, a problem which must be addressed in the treatment of some ores is preg robbing. In carbonaceous ores, preg robbing occurs as active carbon indigenous to the ore has the ability to rob gold from the cyanide bearing leach solution, reducing recovery. Pressure oxidation can partially deactivate the indigenous carbon, but by itself is not sufficient for highly preg-robbing ores. To further reduce preg-robbing problems, blanking agents such as kerosene or sodium lauryl sulfate have been used to further deactivate carbon in the ore. Carbon-in-leach has been successful for mildly preg-robbing ores, as the activated carbon added to the slurry possesses adsorption kinetic characteristics superior to those of the indigenous carbon, allowing the gold to load onto the added carbon as soon as it is leached, before it can load onto the carbon in the ore. Carbon-in-leach alone, however, has not been completely successful in treating highly preg-robbing ores.

An additional problem in recovering gold from highly carbonaceous ores is that a significant quantity of the gold has been adsorbed onto carbon during formation of the mineral deposit. This gold will only become available to a lixiviant which can remove it from the carbon. The use of a cyanide lixiviant alone has not been entirely successful in leaching gold locked in carbonaceous material.

Ball et al., U.S. Pat. No. 4,902,345, disclose treating refractory carbonaceous and sulfidic ores by thiourea leaching in the presence of carbon rather than cyanide leaching. Kerley, Jr., U.S. Pat. Nos. 4,269,622 and 4,369,061, disclose using an ammonium thiosulfate leach solution containing copper to leach gold and silver from ores containing manganese. Perez et al., U.S. Pat. No. 4,654,078, disclose leaching gold and silver with a copper-ammonium thiosulfate lixiviant to produce a pregnant leach solution. Gold and silver are then precipitated onto a copper cement added to the pregnant leach solution. Wan et al., U.S. Pat. No. 5,354,359, disclose leaching gold from preg-robbing ores with a thiosulfate lixiviant followed by cementation or precipitation of the leached precious metal values. PCT application WO 91/11539 discloses recovering gold from a gold-loaded thiosulfate solution by adding cyanide to form a gold cyanide complex followed by adsorbing the gold cyanide complex onto a carbon or resin adsorbent.

SUMMARY OF THE INVENTION

Among the several objects of the invention, therefore, is the provision of a process for recovering gold from ores in which gold is locked in refractory sulfidic and carbonaceous material. Another object is the provision of such a process which overcomes preg-robbing problems associated with highly carbonaceous ores. A further object is the provision of such a process characterized by reduced capital costs, reduced reagent consumption, and environmental compatibility.

Briefly, therefore, the invention is directed to a process for recovering gold by forming an aqueous ore slurry comprising a refractory sulfidic and refractory carbonaceous ore having preg-robbing characteristics due to the presence of organic carbon and subjecting the ore slurry to pressure oxidation in an autoclave to produce an oxidized ore slurry. The oxidized ore slurry is mixed with a lixiviant comprising a thiosulfate salt to form a mixture of oxidized ore slurry and lixiviant. Gold is leached from the oxidized slurry in a stirred tank reactor system comprising between 2 and 6 agitated leach tanks by maintaining the mixture at a pH between 7 and 8.7 while agitating the mixture with a slurry residence time in each of said tanks of between about 30 and about 120 minutes to produce a leached slurry comprising a solid residue and a gold-bearing leachate. Gold is recovered from the gold-bearing leachate.

The invention is also directed to a process for recovering gold by forming an aqueous ore slurry comprising water and a refractory sulfidic and refractory carbonaceous ore having preg-robbing characteristics due to the presence of organic carbon. The ore slurry is subjected to pressure oxidation in an autoclave under neutral or alkaline conditions to produce an oxidized ore slurry having a pH in the range of between about 6 and 8. The oxidized ore slurry is mixed with a lixiviant comprising a thiosulfate salt and the oxidized slurry and lixiviant are maintained at a temperature in the range of about 25° C. to about 80° C. and at a pH between 7 and 8.7 while the slurry is agitated in a stirred tank reactor system comprising between 2 and 6 agitated leach tanks with a slurry residence time in each of said tanks of between about 30 and about 120 minutes to produce a leached slurry comprising a solid residue and a gold-bearing leachate. Gold is recovered from the gold-bearing leachate.

The invention is also directed to a process for recovering gold by forming an aqueous slurry comprising a refractory sulfidic and refractory carbonaceous ore having preg-robbing characteristics due to the presence of organic carbon. The ore slurry is subjected to pressure oxidation for between about 30 and about 100 minutes in an autoclave at a temperature in the range of between about 185° and 235° C. and an oxygen overpressure of at least about 20 psi to produce an oxidized ore slurry. The oxidized ore slurry is cooled to a temperature between about 40° C. and about 55° C., its pH is adjusted to between 7 and 8.7, and it is mixed with a lixiviant comprising a thiosulfate salt in a proportion of between about 0.025M and 0.1M thiosulfate ion, copper in a proportion of between about 50 and 100 ppm, and sulfite in a proportion of at least about 0.001M, while maintaining the pH between 7 and 8.7. The oxidized slurry and lixiviant are maintained at a temperature in the range of between 40° C. and 55° C. while agitating the slurry in a stirred tank reactor system of between two and six leach tanks to produce a leached slurry comprising a solid residue and a gold-bearing leachate and gold is recovered from the gold-bearing leachate.

Finally, the invention is directed to a process for the recovery of gold from a pressure oxidized slurry of a refractory sulfidic and refractory carbonaceous auriferous ore having preg-robbing characteristics due to the presence of organic carbon in which the oxidized ore slurry is mixed with a thiosulfate lixiviant to produce a leached slurry comprising a solid residue and a gold-bearing leachate, the leached slurry is contacted with cyanide ion and an adsorbent to produce an aurocyanide complex which is loaded onto the adsorbent, and gold is recovered from the aurocyanide complex adsorbed onto the adsorbent.

Other objects and features of the invention will be in part apparent and in part pointed out hereinafter.

DETAILED DESCRIPTION OF THE INVENTION

The present invention provides an improved process for recovery of gold from refractory sulfidic and carbonaceous ores, including relatively lean ores containing as low as 0.065 oz Au per ton. The process is effective for recovery of gold from ores such as those found at The Barrick Gold Goldstrike property in Nevada, which are sulfidic, carbonaceous, and contain iron, arsenic and other heavy metals. In accordance with one embodiment of the process, the various constituents are oxidized under acidic conditions in a pressure oxidation operation in which sulfuric acid is generated, the sulfuric acid is neutralized and oxides and salts are precipitated in a neutralization operation and gold is recovered from the oxidized and neutralized slurry. Preferably, the neutralized slurry is subjected to leaching with ammonium thiosulfate, followed by recovery of gold. In another embodiment of the process, the various constituents are pressure oxidized under neutral or alkaline conditions, and the pressure oxidized slurry is subjected to leaching with ammonium thiosulfate, followed by recovery of gold.

Figure 1:
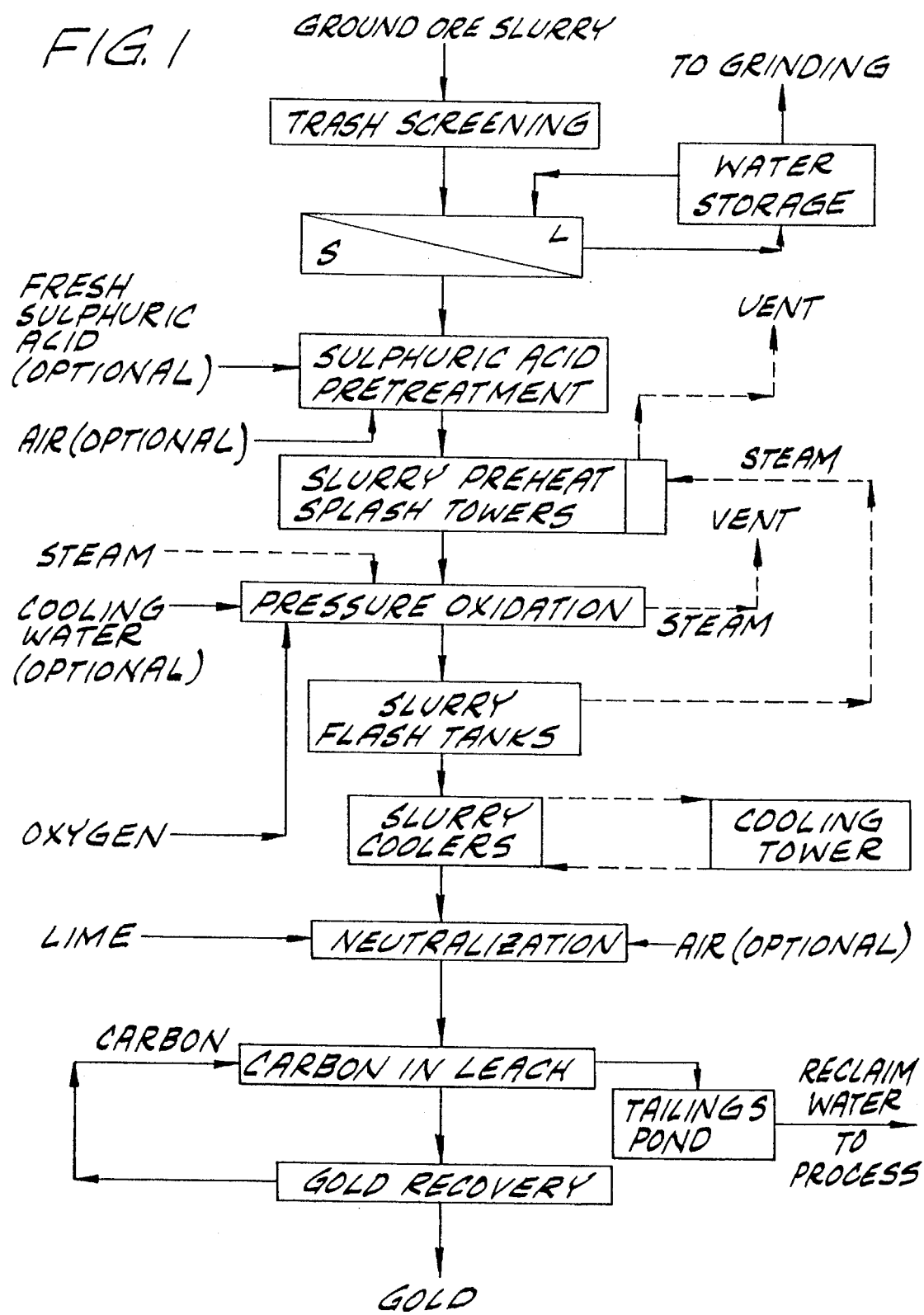
FIG. 1 is a flowsheet of the overall process of one embodiment of the invention.

Illustrated in FIG. 1 is a preferred process of the invention. According to the process of this flowsheet, the ore is crushed and wet milled, and the ground ore slurry is screened for trash or tramp material. Next the ground ore is thickened by removal of excess water in a solid-liquid separation operation.

Depending on the ore, it is in some instances desirable to acidulate the ore with sulfuric acid to neutralize all or part of the carbonate. Depending on the carbonate content of the ore, acidulation may be required continuously to a varying degree or may only be required during start-up. For other ores, the carbonate content is sufficiently high that it is uneconomical to acidulate the ore prior to pressure oxidation, and the carbonate is tolerated without acidulation.

In a first embodiment, the ore slurry is subjected to pressure oxidation in an autoclave in the presence of sulfuric acid using oxygen gas at elevated pressure. Although the ore may be processed in the autoclave on a batch or a continuous basis, treatment on a continuous basis is preferred. A single, multi-compartmented autoclave is preferred but multiple separate autoclave vessels may be used. References herein to "autoclave" and "compartments" encompass a single, multi-compartmented autoclave as well as an autoclave system comprising multiple, separate, autoclave vessels. Sulfide sulfur is oxidized in the autoclave, thereby releasing gold from the refractory sulfide matrix within which it is embedded. It is sometimes necessary to introduce sulfuric acid into the autoclave feed in order to promote rapid oxidation of sulfide sulfur in the ore and achieve maximum release of the gold entrapped in the sulfide. Sulfuric acid is produced in situ as the oxidation proceeds, but an outside source of acid may be necessary to initiate the reaction and achieve adequate productivity. An excess of sulfuric acid is maintained during oxidation in order to promote substantially complete oxidation and ensure that the gold-entrapping sulfide sulfur content of the oxidized slurry is reduced to a practical minimum so as to minimize the amount of gold ending up in the leach tailings. However, the amount of excess acid is controlled since excess acid must be neutralized prior to leaching. The concentration of excess acid, expressed in grams of acid per liter of solution, is preferably less than about 25 grams per liter (gpl), more preferably less than about 10 gpl, and most preferably between about 5 and 10 gpl. By controlling the amount of excess sulfuric acid in the oxidized slurry, not only is there a reduction in the amount of lime used and the quantity of salts generated, but the equipment ancillary to the autoclave can be manufactured from less costly materials of construction. For example, items of equipment, piping, valves and the like can be constructed of lower grade alloys instead of costlier, more acid-resistant materials as has been the prior practice.

In an alternative embodiment of the process of the invention, pressure oxidation is carried out under neutral or alkaline conditions. Although many auriferous ores are not rendered sufficiently amenable to gold recovery by alkaline pressure oxidation, for those ores for which this alternative procedure is feasible, savings in sulfuric acid use and neutralization operation costs are among the advantages achieved. Neutral or alkaline conditions are imparted by alkaline material indigenous to the ore, such as carbonates, and/or by added alkaline material, such as lime, sodium carbonate, or sodium hydroxide. In one preferred embodiment, between about 5 and about 40 kg sodium hydroxide per ton of ore is added to the slurry.

In practice, the amount of sulfide sulfur which must be oxidized depends on the nature of the sulfides present and the distribution of the gold in the various sulfides. Typically, oxidation of 50% to over 95% of the sulfide sulfur is advantageously practiced.

Energy from the exothermic pressure oxidation is recovered by heat exchange between the oxidized slurry and feed to the autoclave. As indicated in FIG. 1, this heat exchange is preferably effected by letting down the pressure of the oxidized slurry and using the steam which is flashed from the oxidized slurry to heat the autoclave feed, preferably by direct contact in splash condensers positioned ahead of the autoclave.

After the oxidized slurry is partially cooled by flashing of steam, it is further cooled and then passed directly to a neutralization operation. Although an intermediate washing and/or liquids-solids separation step may be employed, direct neutralization after cooling is preferred to minimize capital costs. Here lime and/or other base is added to increase the pH and render the slurry amenable to subsequent leaching.

Figure 2:
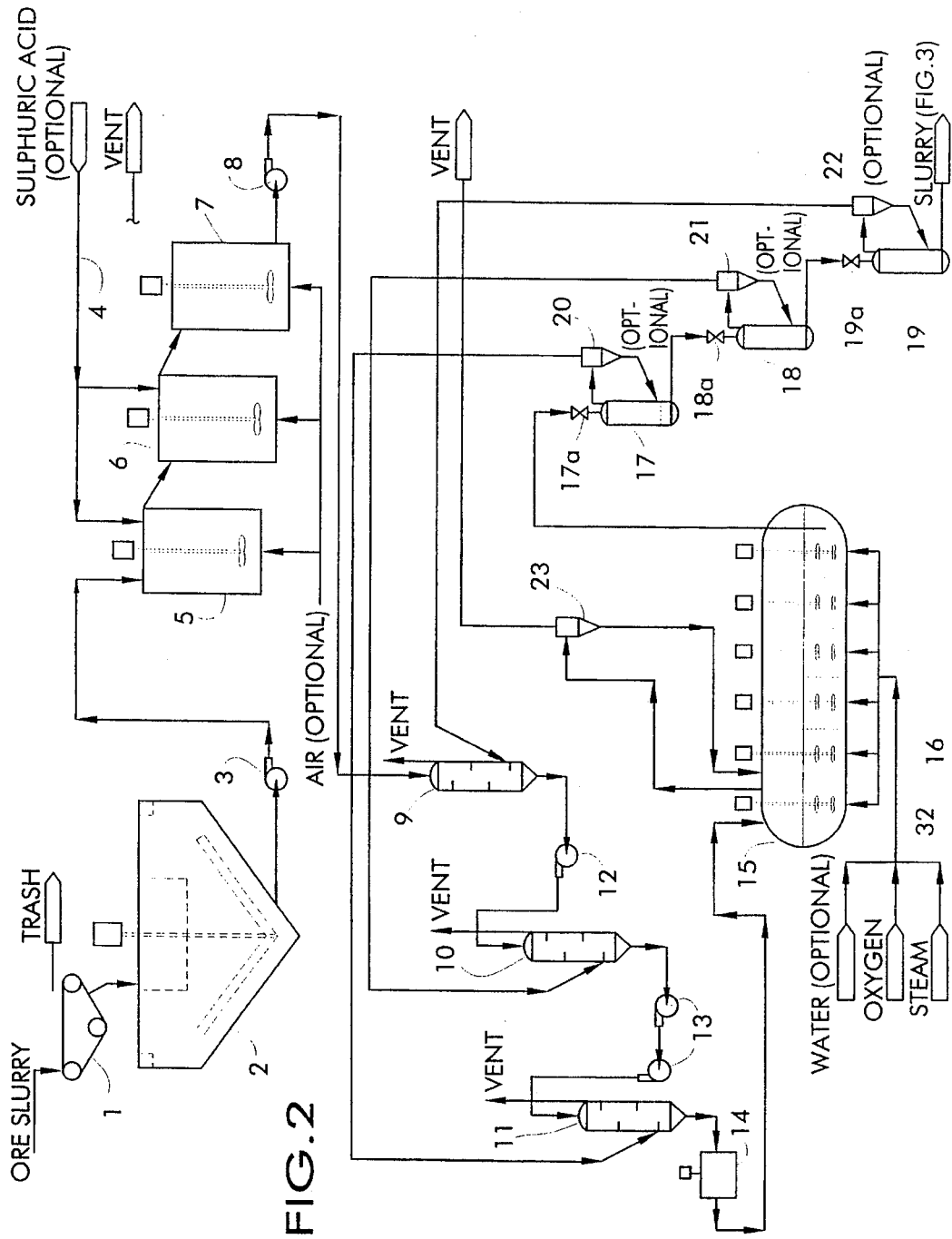
FIG. 2 is a more detailed flowsheet of the embodiment of the invention illustrated in FIG. 1.

Referring to FIG. 2, a particularly preferred embodiment of the invention will be described in detail. Ground ore slurry, a substantial fraction of which, for example 65–85% or more by weight, passes 200 mesh, is directed to a trash screen 1 where rock, wood fiber, trash and plastic larger than 30 mesh are separated and removed. The ore slurry passing through the screen is directed to a mechanical thickening device 2, typically a vertical tank of large diameter which provides a net vertical flow low enough to permit sedimentation of the solid particles. In the thickener, the concentration of the ore slurry is increased from a range of about 10–25% by weight solids to a range of about 40–55%, preferably 50–55%, by weight solids to minimize autoclave size and therefore capital costs. To promote separation of solids, a flocculant is preferably added to the thickener, for example, the polymeric flocculant sold under the trade designation Percol 351 or Superfloc 216, at a dosage of about 0.05 to about 0.2 pounds per ton of ore and at a concentration of about 0.01% to about 2% by weight into the thickener feed. Overflow from the thickener is recycled to the grinding circuit. Thickened ore slurry underflow from the thickener is directed by a transfer pump 3 to a series of stirred acidulation tanks 5, 6 and 7, through which the slurry passes continuously. A fresh sulfuric acid stream (optional) 4 is added to the acidulation tanks in order to release carbon dioxide from the carbonate contained in the slurry, and thereby reduce the equivalent carbon dioxide levels in the ore. Whereas the ore fed to the optional acidulation operation may typically contain up to about 10% $CO_3$, the feed to the autoclave, if acidulation is practiced, preferably contains no more than about 3% $CO_3$. To promote removal of $CO_2$, compressed air may be sparged into the acidulation tanks.

Slurry leaving the acidulation tanks or, if acidulation is not practiced, leaving the thickener, having an adjusted solids content of at least about 30%, preferably about 40–55%, optimum of 50–55% by weight, is fed by a transfer pump 8 to the first of a series of brick lined splash condensers 9, 10 and 11, in which the treated feed slurry for the pressure oxidation step is preheated by contact with steam flashed from the oxidized slurry leaving the pressure oxidation. The successive splash condensers are each, preferably, internally baffled to promote contact between steam and liquid, and are respectively operated at progressively higher pressure and temperature. Centrifugal pumps are interposed to increase the pressure of the slurry between condensers, pump 12 transferring the slurry from condenser 9 to condenser 10, and pumps 13 transferring the slurry from condenser 10 to condenser 11. Preferably, condenser 9 is operated at about atmospheric pressure, condenser 10 is operated at a medium pressure, and condenser 11 is operated under a higher steam pressure. Addition of live steam to the slurry leaving the last splash condenser may be indicated for bringing the slurry to a temperature of at least about 175°–180° C., at which the exothermic pressure oxidation reactions are proceeding at a high rate.

A further process option is the addition of between about 50 and about 200 ppm chloride, preferably about 100 ppm chloride, to the autoclave feed in the form of a chloride salt such as sodium chloride. The chloride is believed to increase the kinetics of the sulfide oxidation reaction and facilitate oxidation of carbon in the autoclave.

Pressure oxidation is carried out in an autoclave 15, having a number of segmented, agitated compartments, preferably multi-lined, the last lining being brick, to which the slurry is transferred, preferably by a positive displacement diaphragm pump 14, from the last splash condenser 11. The compartments of the autoclave are preferably of substantially equal volume. Due to the rounded or dished ends of the first and last autoclave compartments, however, these compartments are often slightly larger. Although the first compartment may be slightly larger than the intermediate compartments, the volume of slurry in the first compartment during pressure oxidation is not greater than about 1.3 times, often not greater than 1.2 times, the volume of slurry in any one of the successive compartments.

In the autoclave, the slurry is passed through the plurality of compartments at a rate which provides a total retention time on the order of 30–100 minutes, and is contacted in the presence of sulfuric acid with oxygen gas at a temperature of between about 185° and about 235° C., an oxygen partial pressure of at least about 20 psi and a total pressure of between about 400 and about 500 psia. Preferably, the temperature of the pressure oxidation is controlled at a level no higher than about 235° C. Temperature is controlled by a variety of means, including venting tailgas from the autoclave, venting steam, as from last splash condenser tank 11 of FIG. 2, and/or injecting cold water directly into the autoclave compartments. In the embodiment of the process involving acidulation of the ore and/or oxidation under acidic conditions, the final acidity of the slurry leaving the last compartment of the autoclave is between 5 and 25 grams sulfuric acid per liter of solution. In the embodiment of the process involving pressure oxidation under neutral or alkaline conditions, the pH of the slurry leaving the last compartment of the autoclave is between about 6 and 8.

In both the acidic pressure oxidation process and neutral/alkaline pressure oxidation process, oxygen is introduced to each compartment by way of sparge pipes, which extend from the top of the autoclave, down along the autoclave wall, and to a position underneath the agitators. Oxygen is flowed through the sparge pipes and injected into the slurry beneath the agitator in each compartment. A rotameter for each compartment monitors the flow of oxygen thereto and associated valves are used to control such flow, manually or automatically. Oxygen flow to the various compartments is controlled and, if desired, oxygen utilization can be controlled as described in commonly assigned co-pending U.S. patent application Ser. No. 317,475, the entire disclosure of which is expressly incorporated herein by reference. In accordance with this method, it has been discovered that increased oxygen utilization can be achieved without sacrificing gold recovery.

Oxidation of the sulfides in the ore, the vast majority of which are iron sulfides, is believed to occur primarily in accordance with the following two reactions:

(1) 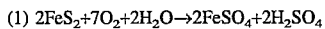
$$2FeS_2 + 7O_2 + 2H_2O \rightarrow 2FeSO_4 + 2H_2SO_4$$

(2) 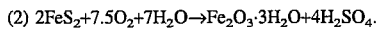
$$2FeS_2 + 7.5O_2 + 7H_2O \rightarrow Fe_2O_3 \cdot 3H_2O + 4H_2SO_4.$$

Stoichiometrically these equations dictate that between 1.75 [7/4] and 1.875 [7.5/4] moles $O_2$ are required to oxidize each mole $S^=$. In the Goldstrike ore the vast majority of sulfides which must be oxidized are the gold-occluding sulfidic minerals pyrite and marcasite.

Continuing the gold recovery process as shown in FIG. 2, noncondensables and steam generated during the pressure oxidation operation are vented optionally through a cyclone 23 which separates entrained solids for return to the autoclave. Oxidized slurry leaving the autoclave is passed to a series of flash tanks 17, 18, and 19, through control valves 17a, 18a, and 19a, respectively, where steam is flashed off to cool the slurry. Steam from each flash tank is recycled and contacted with autoclave feed slurry in a complementary splash condenser, operated at substantially the same pressure as the flash tank, for preheating the feed slurry. Thus, in the series as illustrated in FIG. 2, the first flash tank 17 is coupled to the last splash condenser 11, the second flash tank 18 is coupled with the second condenser 10, and the last flash tank 19 is coupled with the first splash condenser 9. Typically, between 1 and 3 flash tanks and between 0 and 3 condensers are employed. The preferred embodiment employs two flash tanks and two splash condensers.

Steam leaving each of flash tanks 17, 18 and 19 is optionally passed through a cyclone 20, 21 and 22, respectively, for recovery of entrained solids. An alternative to using cyclones is to use larger diameter flash tanks, reducing the number of items of equipment thereby simplifying maintenance and operations. The recovered solids are blended back into the oxidized slurry.

Figure 3:
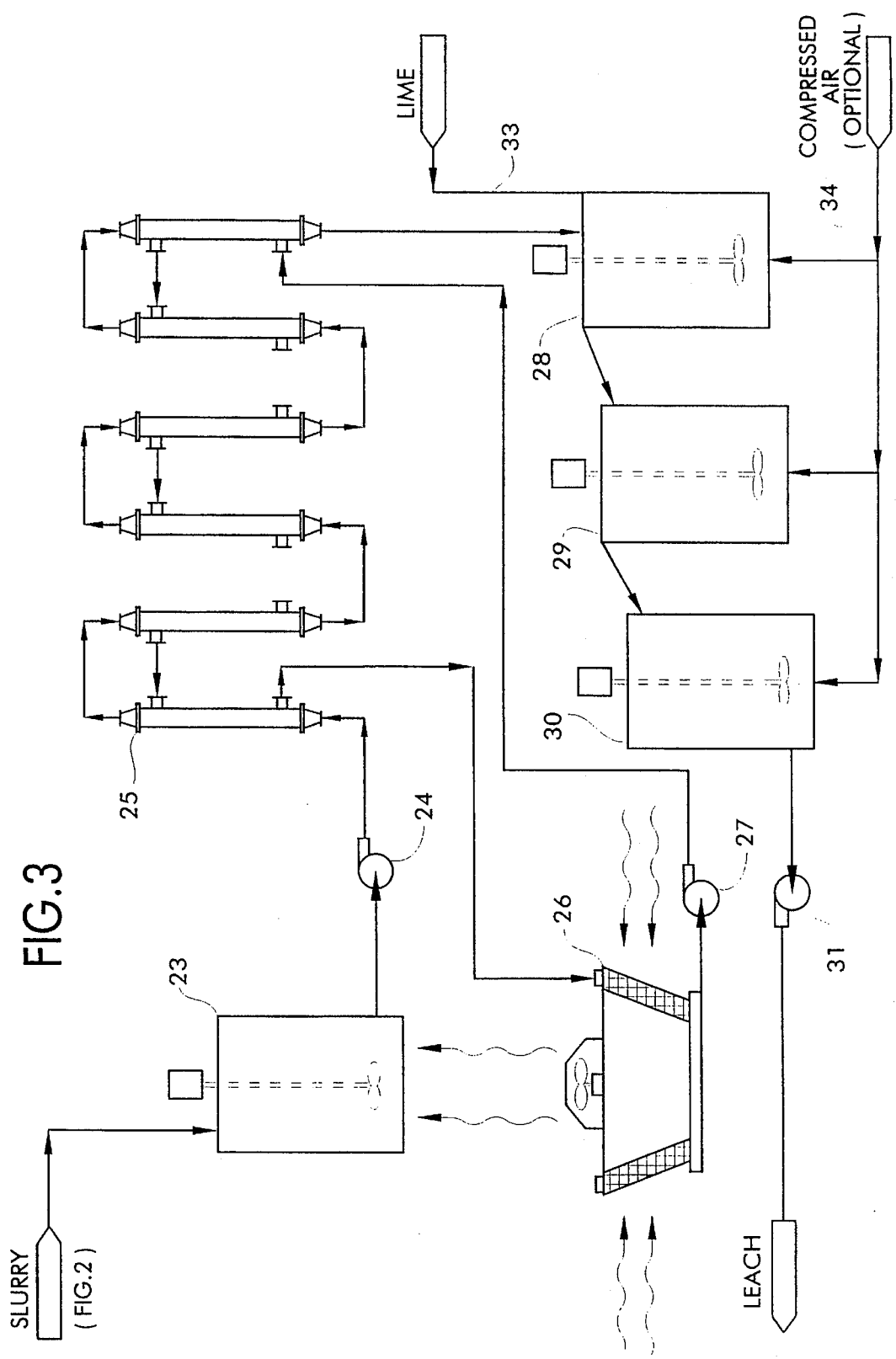
FIG. 3 is a more detailed flowsheet illustrating the cooling and neutralization steps in a preferred embodiment of the invention.

Referring to FIG. 3, hot oxidized slurry from the autoclave flash tank 19, having a solids content of at least about 30% by weight, preferably at least about 35% by weight, and containing soluble sulfates, iron salts, arsenates, etc., is transferred to an intermediate agitated storage tank 23. In order to condition the slurry for gold recovery operations, the temperature of the hot oxidized slurry is reduced to between about 90° F. and about 140° F., preferably between about 110° F. and about 130° F., more preferably below about 120° F. by passing the slurry, by means of pump 24, through a series of shell and tube coolers 25. The temperature of the slurry is reduced by exchanging heat from the slurry to a cooling water stream. Cooling water is obtained from a recirculating system in which the water is recycled through a crossflow, induced draft cooling tower 26 by pump 27.

Cooled oxidized slurry which is discharged from the coolers 25 is fed continuously through a series of rubber or epoxy lined agitated neutralization tanks 28, 29 and 30. In accordance with the process described in U.S. Pat. No. 5,071,477, the entire disclosure of which is expressly incorporated herein by reference, the cooled oxidized slurry may be directly neutralized without either washing the slurry or separating solids therefrom prior to neutralization. By omitting any washing operation between the autoclave and the neutralization operation, as is preferred but not required, the volume of materials handled is reduced and the need for other ancillary operations such as wash water recovery is avoided.

The autoclave conditions and means for recovery of exothermic reaction heat provide not only efficient gold recovery but efficient use of energy. In another embodiment (not shown) the transfer of heat from the oxidized slurry to the slurry autoclave feed can be accomplished by indirect heat exchange rather than by coupled flash tanks and splash condensers. In that embodiment the indirect heat exchanger is preferably a double pipe exchanger in which the inner pipe is constructed of an acid resistant metal or alloy and the outer pipe of steel. The oxidized slurry is passed through the interior pipe and the relatively cold pressure oxidation feed slurry is passed through the annular space between the pipes. The interior pipe of the heat exchanger, which is in contact with the highly acidic streams leaving the autoclave need not be constructed from titanium as generally has been the practice. Instead, alloy 20 or other similar acid resistant alloy can be used, thereby significantly lowering the cost of the heat exchanger.

In both of the alternatives described above for cooling the slurry, it is important that the cooling/heat exchange occur prior to the neutralization and leaching reagent addition operations described below. If the slurry is not at a temperature below about 150° F., preferably below about 140° F., more preferably below about 130° F., the loss of the various reagents to volatilization or oxidation would render the process economically infeasible.

In the neutralization operation the slurry is neutralized with a slurry of lime and/or other base to raise its pH to preferably between 7 and 8.7, more preferably to about 8.5. Lime is highly preferred but the neutralization may be carried out with other bases which form sulfate salts on reaction with sulfuric acid and are capable of raising the pH to a level at which iron and arsenate salts are precipitated. Compressed air 34 is optionally sparged into the slurry in the neutralization tanks to convert ferrous iron to ferric iron. The neutralized slurry, having a solids content of 30–40% by weight and a temperature of about 75°–95° F., is then directed to a thiosulfate leach operation by transfer pump 31.

Figure 4:
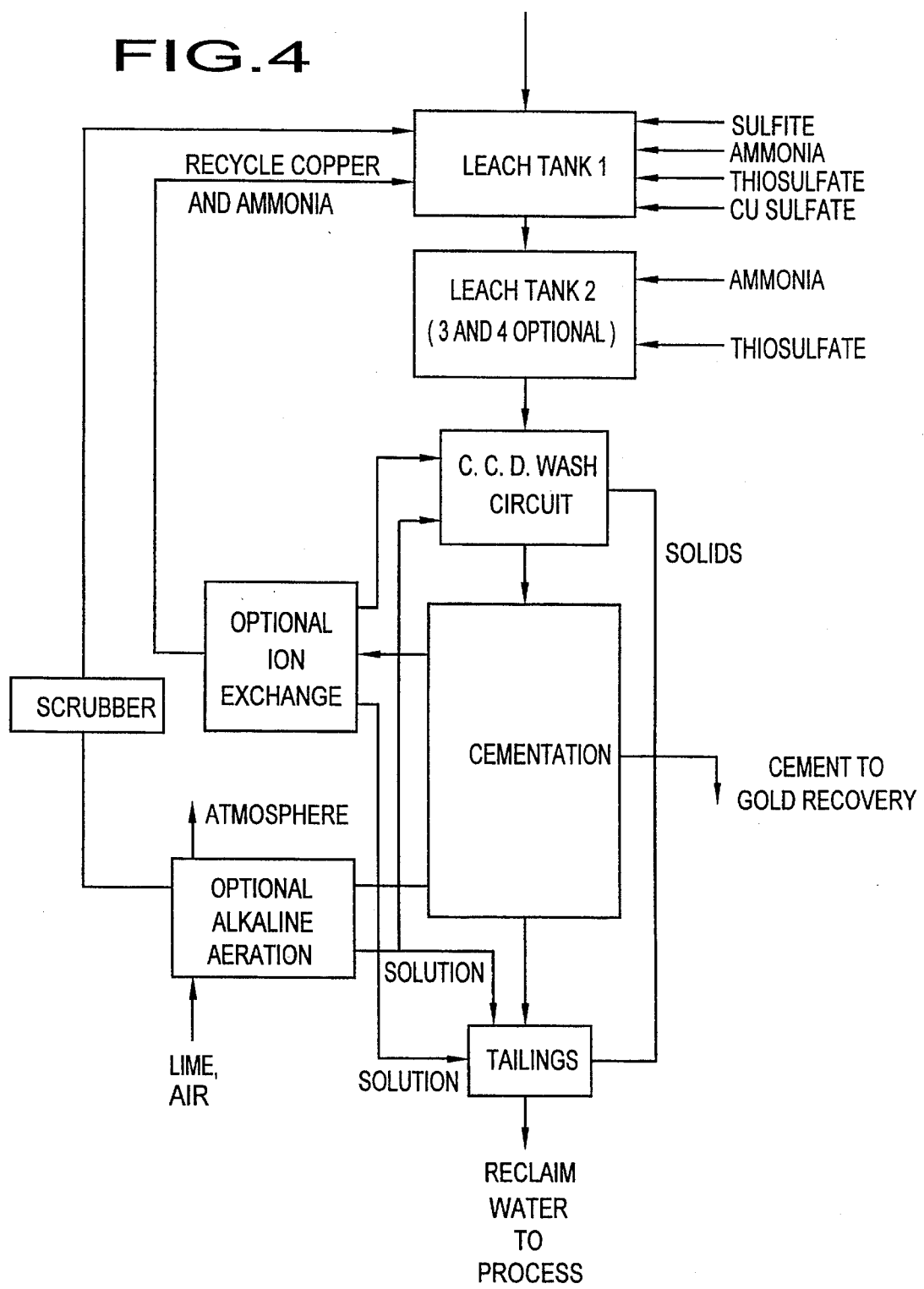
FIGS. 4 and 5 are flowsheets illustrating alternative embodiments of the leaching operations and gold recovery of the invention.

Following neutralization the ore slurry is passed to one or more leach tanks where thiosulfate lixiviant is added as shown in FIG. 4. The preferred lixiviant is ammonium thiosulfate solution having between about 0.025M and 0.1M thiosulfate ion, most preferably about 0.04M thiosulfate ion. Alternative embodiments employ other soluble thiosulfate salts, such as calcium thiosulfate or sodium thiosulfate, having the same thiosulfate ion concentrations, rather than ammonium thiosulfate. Leaching is performed in a stirred tank reactor system on a batch or continuous basis. In continuous mode, the stirred tank reactor system preferably comprises from two to six stages of mechanically agitated tanks, preferably from two to four, preferably four, arranged in series so that slurry flow cascades from one tank to the next by gravity. The leaching of gold is accomplished by oxidation of metallic gold and complexing with thiosulfate to form the $Au(S_2O_3)_2^{3-}$ complex according to the following reaction:

$$2Au + \tfrac{1}{2}O_2 + 4S_2O_3^{2-} + H_2O \rightarrow 2Au(S_2O_3)_2^{3-} + 2OH^-$$

The slurry flowing through the leach tanks is between about 30 and 45% solids, preferably about 40% solids. The residence time at each stage is between about 30 and 120 minutes, preferably about 60 minutes. A temperature of between about 45° C. and 60° C., preferably between about 45° C. and 55° C., is maintained throughout leaching to promote rapid dissolution of gold to form the soluble $Au(S_2O_3)_2^{3-}$ complex.

In addition to thiosulfate, the lixiviant solution contains a catalyst, preferably cupric ion, to promote solubilization of the gold as the thiosulfate complex. The cupric ion may be chemically reduced through reaction with thiosulfate, sulfite or gold.

$$2Cu^{2+} + 8S_2O_3^{2-} \rightarrow 2Cu(S_2O_3)_3^{5-} + S_4O_6^{2-}$$
$$2Cu^{2+} + SO_3^{2-} + H_2O + 6S_2O_3^{2-} \rightarrow 2Cu(S_2O_3)_3^{5-} + SO_4^{2-} + 2H^+$$
$$2Cu^{2+} + 2Au + 10S_2O_3^{2-} \rightarrow 2Cu(S_2O_3)_3^{5-} + 2Au(S_2O_3)_2^{3-}$$

The cupric ion is thought to exist in ammoniacal solution as the cupric tetrammine ($Cu(NH_3)_4^{2+}$) and the above equations can be modified to include this species. The gold leaching reaction is the desired reaction. The oxidation of thiosulfate is generally to be regarded as undesirable although it may be possible for the tetrathionate ($S_4O_6^{2-}$) to behave as an oxidant toward gold. Sulfite has the role of a sacrificial reductant and reduces the rate of thiosulfate oxidation. Oxygen may react with the gold directly or it may react with cuprous thiosulfate species to form a cupric species which subsequently oxidizes gold.

Direct Reaction:

$$O_2 + 4Au + 8S_2O_3^{2-} + 2H_2O \rightarrow 4Au(S_2O_3)_2^{3-} + 4OH^-$$

Catalytic Mechanism:

Step 1, Cuprous oxidation by oxygen:

$$O_2 + 4Cu(S_2O_3)_3^{5-} + 2H_2O \rightarrow 4Cu^{2+} + 12S_2O_3^{2-} + 4OH^-$$

Step 2, Cupric leaching of gold:

$$4Cu^{2+} + 4Au + 20S_2O_3^{2-} \rightarrow 4Cu(S_2O_3)_3^{5-} + 4Au(S_2O_3)_2^{3-}$$

Step 3, Overal 1:

$$O_2 + 4Au + 8S_2O_3^{2-} + 2H_2O \rightarrow 4Au(S_2O_3)_2^{3-} + 4OH^-$$

It has been discovered that the cupric ion concentration should be maintained in the range of 50–500 ppm and that, if the cupric ion concentration is allowed to drop too low, gold recovery suffers. Cupric ion is maintained in solution by the addition of ammonia in an amount sufficient to ensure a minimum molar ratio of 4:1 $NH_3$:Cu, preferably with about 10% excess ammonia, to form the stable copper amine, tetrammine copper sulfate.

In order to minimize losses of ammonia, and minimize precipitation of gold and copper associated with such losses, the pH during the leaching operation is maintained in the range of 7 to 8.7, most preferably about 8.5. Under the agitated leach conditions of the invention, it has been discovered that at higher pH than that of the invention, notably reduced gold yields result.

As an optional measure to minimize reagent loss and reduction in gold recovery through oxidation of thiosulfate to tetrathionate, trithionate, sulfate, and other oxidized species, a slight excess of sulfite, 0.001M to 0.1M, preferably 0.01M to 0.05M, is added in the form of sodium metabisulfite or sulfur dioxide. Under oxidizing conditions reagent loss can occur by oxidation of thiosulfate by the following reaction:

$$2(NH_4)_2S_2O_3 + \tfrac{1}{2}O_2 + H_2O \rightarrow (NH_4)_2S_4O_6 + 2NH_4OH$$

Added ammonium sulfite reduces tetrathionate to thiosulfate by the following reaction:

$$(NH_4)_2SO_3 + 2NH_4OH + (NH_4)_2S_4O_6 \rightarrow 2(NH_4)_2S_2O_3 + (NH_4)_2SO_4 + H_2O$$

The thiosulfate equilibrium with sulfite and sulfide is as follows: $6H^+ + 4SO_3^{2-} + 2S^{2-} \leftrightarrow 3S_2O_3^{2-} + 3H_2O$, such that without added sulfite the equilibrium is shifted to the left, which favors the precipitation of gold sulfide. Sulfite addition therefore stabilizes the lixiviant and improves gold recovery.

In the preferred embodiment when from two to four leach tanks are used, copper sulfate, sulfite, ammonia and thiosulfate are added to the first tank and ammonia and thiosulfate are added to tanks two through four. The ammonia source may be fresh ammonia or recycled ammonia recovered from the slurry or barren leachate after gold recovery.

The slurry containing the gold-bearing lixiviant solution and solid residue are then fed to a gold recovery operation. In one embodiment illustrated in FIG. 4, gold is recovered by zinc, copper, or iron cementation. The slurry leaving the thiosulfate leaching operation is subjected to a countercurrent decantation (CCD) wash circuit and the solids portion removed as tailings. Zinc, copper or iron powder is added to the pregnant leachate to precipitate gold, and gold is subsequently recovered by refining in furnaces. The barren leachate is sent directly to tailings and/or to an optional ammonia and copper recovery operation as shown in FIG. 4.

Figure 5:
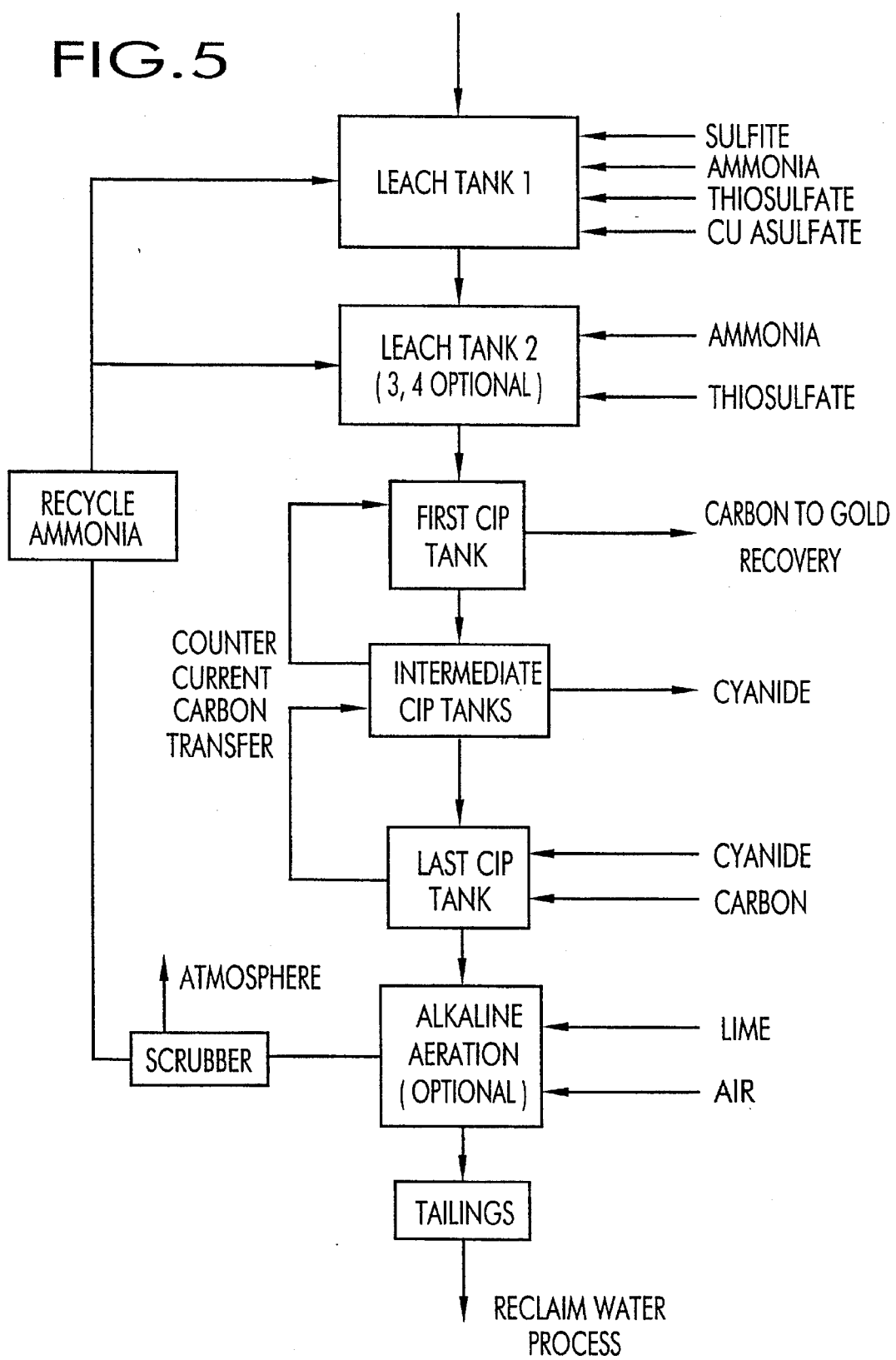

In an alternative embodiment shown in FIG. 5, gold is recovered by a modified carbon-in-pulp (CIP) process. Immediately prior to entering the CIP circuit, ammonia is added to the slurry to ensure that the copper is present as amine and to prevent the formation of cupric cyanide during subsequent cyanidation, which interferes with adsorption of aurocyanide complex onto an adsorbent. It has been discovered that cupric amine is maintained stable in solution by the addition of ammonia in an amount sufficient to make up for ammonia losses in the thiosulfate leach circuit to ensure a minimum molar ratio of 4:1 $NH_3$:Cu, preferably with about 10% excess ammonia. Although this slight excess of ammonia is desired, ammonia additions are deliberately limited to avoid significantly altering the pH of the slurry.

The slurry containing the gold-bearing lixiviant and solid residue are fed to the first tank of a carbon-in-pulp circuit, which includes 2 to 8 stages, preferably 4 to 7 stages, more preferably 6 stages. Cyanide ion is added directly to each stage except the first, and adsorbent is added to the last stage and transferred counter-currently toward the first stage, while the slurry moves from the first stage toward the last stage. The adsorbent is preferably activated carbon in a proportion of at least about 10 grams per liter of slurry. Sodium cyanide is the preferred source of cyanide ion. The cyanide ion and an adsorbent are therefore contacted directly with the slurry without first separating the pregnant thiosulfate lixiviant from the solid residue. Because contact is made directly between the cyanide/adsorbent and the pregnant lixiviant/solid residue, the process advantageously dispenses with a need for a liquid/solids separation or washing operation prior to cyanidation. In the preferred embodiment, cyanide ion is added in quantities so as to be in a molar ratio to dissolved gold of between about 2:1 and 6:1, preferably about 4:1. The gold from the gold-thiosulfate complex formed during leaching is dissociated from the thiosulfate and associated with the cyanide to form a gold-cyanide complex. Cyanide therefore replaces thiosulfate and, advantageously, the gold-cyanide complex is readily adsorbed onto activated carbon or other suitable adsorbent. The cyanide therefore functions not as a lixiviant, as with conventional carbon-in-leach or carbon-in-pulp operations, but as a mechanism for transferring the gold from the thiosulfate lixiviant to the adsorbent. The residence time in the CIP tank is between about 2 and 48 hours, preferably about 12 hours.

Although the CIP operation is described above as a counter-current operation, an alternative embodiment of the process involves cyanidation and recovery of the gold-loaded adsorbent co-currently, in one or more vessels. In one variation of co-current operation, the NaCN and adsorbent are added directly to the last stage of thiosulfate leaching circuit, eliminating the need for this separate CIP leaching vessel.

After adsorption of the aurocyanide complex onto the adsorbent, the loaded adsorbent is separated from the solid residue and solution. Loaded adsorbent recovered from the CIP operation is stripped with hot alkaline cyanide solution and gold is recovered from the stripping solution, preferably by electrowinning and refining.

The solid ore residue can be separated from the solution and the solution is recycled for thiosulfate recovery, regeneration, and use in the thiosulfate leaching operation. The solid residue is sent to a tailings disposal operation.

A further option for gold recovery in accordance with this invention is to separate the gold-bearing leachate from the solid residue and contact the gold-bearing leachate with an adsorbent, such as an ion exchange resin or a solvent extraction reagent, having an affinity for the gold-thiosulfate complex. For example, a weak base ion exchange resin, such as a resin available from Rohm & Haas under the trademark Amberlite IRA 743, is used as the adsorbent.

A still further option in accordance with this invention is to separate the gold-bearing leachate from the solid residue and contact the leachate with cyanide ion to form gold-cyanide complex. The solution containing the gold-cyanide complex is then contacted with an adsorbent column of activated carbon or other adsorbent having an affinity for the gold-cyanide complex.

After gold recovery, ammonia is optionally recovered from the barren leachate or slurry. Ammonia is recovered from the slurry by adding a basic compound, preferably lime, to raise the pH to about 10.5 and aerating the slurry to drive off the ammonia as shown in FIG. 5. The ammonia is then scrubbed from the off-gas and recycled to the leach circuit. In a variation of this ammonia recovery process, the slurry is first separated into a solid residue and barren leachate, lime is added to the leachate to raise its pH to about 10.5, and it is aerated to drive off ammonia. The ammonia is then scrubbed from the off-gas and recycled to the leach circuit. The solution is sent to tailings and/or recycled to a CCD wash circuit. In an additional ammonia recovery variation applicable to the process wherein the gold recovery operation involves separation of the slurry into a solid residue and leachate, ammonia is recovered directly from the barren leachate by alkaline aeration (FIG. 4).

As shown in FIG. 4, a further option for treating the barren leachate is to contact it with an ion exchange resin having an affinity for copper amine to separate the copper amine from the barren leachate. Copper and ammonia are recovered from resin and recycled to the thiosulfate leach operation while the solution is recycled to the CCD wash circuit and/or bled to the tailings.

An advantage to removing the ammonia from the barren leachate is that, as a consequence, copper precipitates out of the barren leachate. Reclaim water can therefore be recycled without dissolved copper. Such reclaim water is suitable for use in a cyanide leach circuit operated in parallel with the thiosulfate leach circuit, since copper, known to interfere with cyanidation, would be minimized.

Further illustration of the invention is provided by the following examples:

EXAMPLE 1

Three gold ores from the Carlin area of Nevada were subjected to pressure oxidation under neutral or alkaline conditions and thiosulfate leaching. The head analysis of the ores was as follows:

| | ORE | | |
|---|---|---|---|
| ELEMENT | A | B | C |
| Au, g/t | 6.79 | 4.62 | 6.13 |
| Au, oz/T | 0.20 | 0.13 | 0.18 |
| Fe, % | 1.35 | 2.67 | 1.05 |
| As, % | 0.06 | 0.06 | 0.02 |
| S(t), % | 1.22 | 2.54 | 1.24 |
| S(=), % | 1.06 | 2.50 | 1.19 |
| C(t), % | 7.35 | 5.61 | 6.41 |
| C(g), % | 1.84 | 1.55 | 1.26 |
| CO2, % | 20.6 | 14.9 | 15.8 |
| Al, % | 1.97 | 1.90 | 1.83 |
| Cd, % | <0.001 | <0.001 | <0.001 |
| Cu, % | 0.004 | 0.004 | 0.005 |
| Mn, % | 0.028 | 0.094 | 0.013 |
| Na, % | 0.023 | 0.077 | 0.028 |
| Sb, % | <0.005 | <0.007 | <0.005 |
| Te, % | <0.001 | <0.001 | <0.001 |

The ores were ground to at least 80% passing 200 mesh. Samples of the ore were slurried with water to a pulp density of about 40% solids and a quantity of NaCl was added. Under laboratory batch conditions, the slurry was pressure oxidized in an autoclave under neutral or alkaline conditions for 1–3 hours at 175°–225° C. and 700 kpa oxygen overpressure. The specific times, temperatures, amounts of NaCl addition, finishing pH and sulfide oxidation achieved were as follows:

| Test No. | Ore | Grind -200M % | Time h | Temp °C. | NaCl kg/t | pH End | S(=) Oxid'n % |
|---|---|---|---|---|---|---|---|
| 51 | A | 94 | 1 | 225 | 0.05 | 6.8 | 72.2 |
| 65 | A | 94 | 1 | 225 | 0.05 | 6.8 | 72.2 |
| 58 | A | 94 | 3 | 175 | 0.25 | — | 35.4 |
| 66 | A | 94 | 3 | 175 | 0.25 | — | 35.4 |
| 59 | A | 94 | 6 | 175 | 0.25 | — | 50.0 |
| 70 | A | 94 | 1 | 225 | 0.31 | 7.4 | 77.4 |
| 71 | A | 94 | 1 | 225 | 0.31 | 7.4 | 77.4 |
| 72 | A | 94 | 1 | 225 | 0.31 | 7.4 | 77.4 |
| 73 | A | 94 | 1 | 225 | 0.31 | 7.4 | 77.4 |
| 60 | B | 97 | 1 | 225 | 0.25 | 7.1 | 60.4 |
| 64 | B | 97 | 1 | 225 | 0.25 | 7.1 | 60.4 |
| 68 | B | 97 | 1.5 | 225 | 0.25 | 6.8 | 79.2 |
| 61 | C | 83 | 1 | 225 | 0.25 | 7.2 | 61.3 |
| 62 | C | 93 | 1 | 225 | 0.25 | 7.4 | 70.6 |
| 63 | C | 99 | 1 | 225 | 0.25 | 7.3 | 68.9 |

Following pressure oxidation the slurry samples were cooled to about 50° C. and lime or sodium hydroxide (about 15–30 kg/ton) was added to raise their pH to about 9.0. A lixiviant containing 14.7 g/L ammonium thiosulfate and 1 g/L copper as copper sulfate was added to the slurry, and leaching was performed with mechanical agitation for 4 hours. The slurry was then subjected to liquid/solids separation and gold extractions were determined by fire assay of the solid residue and atomic absorption of the pregnant solution.

Slurry pHs, leach times, and gold extractions were as follows:

| Test No | pH | Res Au g/t | Head Au g/t | Ext'n Au % |
|---|---|---|---|---|
| 51 | 9.0 | 1.46 | 6.46 | 77.4 |
| 65 | 9.0 | 1.26 | 6.71 | 81.2 |
| 58 | 9.0 | 2.30 | 6.30 | 63.6 |
| 66 | 9.0 | 2.47 | 6.54 | 62.2 |
| 59 | 9.0 | 2.39 | 6.19 | 61.5 |
| 70 | 9.2 | 1.47 | 5.99 | 75.5 |
| 71 | 9.2 | 1.47 | 6.03 | 73.0 |
| 72 | 8.8 | 1.66 | 6.16 | 73.0 |
| 73 | 8.8 | 1.52 | 6.16 | 75.3 |
| 60 | 9.0 | 2.86 | 4.95 | 42.2 |
| 64 | 9.0 | 2.56 | 4.62 | 47.8 |
| 68 | 9.0 | 1.34 | 4.97 | 73.0 |
| 61 | 9.0 | 3.09 | 5.74 | 46.2 |
| 62 | 9.0 | 1.68 | 6.13 | 71.5 |
| 63 | 9.0 | 1.09 | 5.76 | 81.2 |

EXAMPLE 2

A gold ore from the Carlin area of Nevada was subjected to pressure oxidation under acidic conditions and thiosulfate leaching. The head analysis of the ore was as follows:

ORE D

| Au, g/t | 3.48 | Cu, % | 0.003 |
|---|---|---|---|
| Au, oz/T | 0.10 | Mn, % | 0.011 |
| Fe, % | 1.83 | Na, % | 0.084 |
| As, % | 0.09 | Sb, % | 0.006 |
| S(t), % | 2.09 | Te, % | <0.001 |
| S(=), % | 1.79 | | |
| C(t), % | 2.44 | | |
| C(g), % | 1.58 | | |
| CO2, % | 3.1 | | |
| Al, % | 0.07 | | |
| Cd, % | <0.001 | | |

The ore was ground to at least 80% passing 200 mesh. Samples of the ore (Ore D) and ore from the previous example were slurried with water to a pulp density of about 40% solids and a quantity of $H_2SO_4$ was added. Under laboratory batch conditions, the slurry was pressure oxidized in an autoclave under acidic conditions at 700 kpa oxygen overpressure. The specific times, temperatures, amounts of $H_2SO_4$ addition, finishing pH and sulfide oxidation achieved were as follows:

| Test No. | Ore | Grind 200M % | Time h | Temp °C. | $H_2SO_4$ Kg/t | pH End | S(=) Oxid'n % |
|---|---|---|---|---|---|---|---|
| 67 | B | 97 | 1 | 225 | 232 | 0.9 | 97.2 |
| 89 | D | 82 | 1.25 | 225 | 81 | 1.0 | 95.4 |
| 118 | D | 82 | 0.5 | 225 | 92 | 0.9 | 94.2 |

Following pressure oxidation the slurry samples were cooled to about 50° C. and lime (about 65–75 kg/ton) was added to raise their pH to about 8.5–9.0. A lixiviant containing ammonium thiosulfate and copper as copper sulfate was added to the slurry, and leaching was performed with mechanical agitation for 4 hours. The slurry was then subjected to liquid/solids separation and gold extractions were determined by fire assay of the solid residue and atomic absorption of the pregnant solution. Slurry pH, reagent additions, leach times, and gold extractions were as follows:

| Test No. | pH | Am. Thios. g/l | Cu mg/L | Res Au g/t | Head Au g/t | Ext'n Au % |
|---|---|---|---|---|---|---|
| 67 | 9.0 | 14.7 | 1000 | 1.00 | 3.54 | 81.4 |
| 89 | 9.0 | 14.7 | 1000 | 0.62 | 3.17 | 78.3 |
| 118 | 9.0 | 5.0 | 200 | 0.70 | 3.18 | 78.0 |

EXAMPLE 3

A gold ore sample from the Carlin area of Nevada was subjected to pressure oxidation under alkaline conditions and thiosulfate leaching. The ore contained approximately 20% by weight carbonate (as $CO_2$), 1.1% sulfur as sulfide, and 1.8% organic carbon. The ore grade was 6.8 g/t gold. The ore was slurried with water to a pulp density of about 40% solids and about 38 g/t sodium hydroxide was added. Under laboratory batch conditions, the slurry was pressure oxidized in an autoclave under alkaline conditions for 3 hours at 225° C. and 700 kpa oxygen overpressure. Following pressure oxidation the slurry was cooled to about 50° C. and lime added to raise its pH to about 9.0. A lixiviant containing 15 g/L ammonium thiosulfate and 1 g/L copper sulfate was added to the slurry, and leaching was performed for about 4 hours with mechanical agitation. Gold extraction was determined by fire assay of the leach residue and atomic adsorption of the leach solution to be 87.9%.

EXAMPLE 4

A sample of the gold ore of Example 1 was slurried with water to a pulp density of about 40% solids. No sodium hydroxide was added. Under laboratory batch conditions, the slurry was pressure oxidized in an autoclave under alkaline conditions for 3 hours at 225° C. and 700 kpa oxygen overpressure. Following pressure oxidation the slurry was cooled to about 50° C. and lime added to raise its pH to about 9.0. A lixiviant containing 15 g/L ammonium thiosulfate and 1 g/L copper sulfate was added to the slurry, and leaching was performed for about 4 hours with mechanical agitation. Gold extraction was determined by fire assay of the leach residue and atomic adsorption of the leach solution to be 81.5%.

EXAMPLE 5

A sample of the gold ore of Example 1 was slurried with water to a pulp density of about 40% solids. No sodium hydroxide was added. Under laboratory batch conditions, the slurry was pressure oxidized in an autoclave under alkaline conditions. Following pressure oxidation the slurry was cooled to about 50° C. and lime added to raise its pH to about 8.5. A lixiviant containing 2.8 g/L (0.028M) ammonium thiosulfate, excess ammonia as 3.2 g/L ammonium sulfate, and 50 ppm copper as copper sulfate was added to the slurry, and leaching was performed for 2 hours at a temperature of 40° C. with mechanical agitation. Gold extractions was determined to be 70.7%.

EXAMPLE 6

A gold ore sample from the Carlin area of Nevada was subjected to pressure oxidation under acidic conditions and thiosulfate leaching. The ore contained 3.1% by weight carbonate (as $CO_2$), 1.79% sulfur as sulfide, and 1.58% organic carbon. The ore grade was 3.48 g/t gold. The ore was ground to 82% passing 200 mesh and 500 grams were slurried with water to a pulp density of about 40% solids. Concentrated sulfuric acid (22 ml) was added to the slurry, lowering its pH to about 2.0, where it was conditioned by removal of carbonates for about 1 hour. The slurry was then pressure oxidized under laboratory batch conditions for 75 minutes at 224° C. and an oxygen pressure of 88 psig. The pH of the pressure oxidized slurry was about 1.0. Following pressure oxidation the slurry was cooled to about 50° C. and 15% $Ca(OH)_2$ was added, and the slurry held for 1 hour, to raise its pH to about 9.0.

A first portion of the pressure oxidized residue was pulped to about 33% solids Using a water bath, a slurry temperature of about 50° C. was established and maintained and a 0.1M ammonium thiosulfate leachant, containing 14.8 g/L $(NH_4)_2S_2O_3$ and 1 g/L Cu as $CuSO_4 \cdot 5H_2O$, was added. Lime was added to raise the pH and maintain it at about 9.0. The slurry was leached for 4 hours with mechanical agitation sufficiently vigorous to pull a vortex down into the slurry. The leached slurry was filtered and washed with water. The pregnant leach/wash solution and residue were assayed for gold, demonstrating gold recovery of 78.3%.

EXAMPLE 7

A pressure oxidized gold ore slurry containing gold ore from the Carlin area of Nevada was subjected to thiosulfate leaching. Using a water bath, a slurry temperature of about 40° C. was established and maintained and a 0.025M ammonium thiosulfate solution containing 50 mg/L Cu as $CuSO_4 \cdot 5H_2O$ was added. Lime was added to raise the pH to above 8.0. The slurry was leached for 4 hours with mechanical agitation (200 rpm). The leached slurry was filtered and washed with water. The pregnant leach/wash solution and residue were assayed for gold, demonstrating gold recoveries noted below.

| Time hrs. | pH | Res Au g/t | Head Au g/t | Ext'n Au % |
|---|---|---|---|---|
| 1 | 8.6 | 1.79 | 5.84 | 69.4 |
| 2 | 8.6 | 1.75 | 5.97 | 70.7 |
| 4 | 8.4 | 1.77 | 6.02 | 70.6 |

EXAMPLE 8

A pressure oxidized gold ore slurry containing gold ore from the Carlin area of Nevada was subjected to thiosulfate leaching under the same conditions as the previous example, except a lower pH was used. The pregnant leach/wash solution and residue were assayed for gold, demonstrating gold recoveries noted below.

| Time hrs. | pH | Res Au g/t | Head Au g/t | Ext'n Au % |
|---|---|---|---|---|
| 2 | 8.1 | 1.72 | 5.91 | 70.9 |
| 4 | 8.4 | 1.87 | 5.85 | 68.0 |
| 4 | 8.4 | 1.77 | 6.02 | 70.6 |

EXAMPLE 9

A pressure oxidized gold ore slurry containing gold ore from the Carlin area of Nevada was subjected to thiosulfate leaching under the same conditions as the previous example, except higher pH was used and 0.3 g/L $SO_3$ was added to the leachant. The pregnant leach/wash solution and residue were assayed for gold, demonstrating gold recoveries noted below.

| Time hrs. | pH | Res Au g/t | Head Au g/t | Ext'n Au % |
|---|---|---|---|---|
| 1 | 9.1 | 1.83 | 5.28 | 65.3 |
| 4 | 8.9 | 1.80 | 5.68 | 68.3 |
| 2 | 8.5 | 1.62 | 5.75 | 68.3 |
| 4 | 9.6 | 1.85 | 5.95 | 68.9 |

EXAMPLE 10

A pressure oxidized gold ore slurry containing gold ore from the Carlin area of Nevada was subjected to thiosulfate leaching. Using a water bath, a slurry temperature of about 50° C. was established and maintained and a 0.025M ammonium thiosulfate solution containing 100 mg/L Cu as $CuSO_4 \cdot 5H_2O$ was added. Lime was added to raise the pH to 8.9. The slurry was leached for 8 hours with vigorous (600 rpm) mechanical agitation. The leached slurry was filtered and washed with water. The pregnant leach/wash solution and residue were assayed for gold, demonstrating gold recoveries noted below.

| Time hrs. | pH | Res Au g/t | Head Au g/t | Ext'n Au % |
|---|---|---|---|---|
| 3 | 8.9 | 2.02 | 5.80 | 85.2 |
| 6 | 8.8 | 4.43 | 5.63 | 21.3 |
| 8 | 8.6 | 4.16 | 5.88 | 29.3 |

The reduced recoveries after six and eight hours were believed to be due to ammonia losses over time, causing gold and copper to precipitate out of solution, as enhanced by the vigorous agitation.

EXAMPLE 11

Three tests were conducted in which a thiosulfate leach solution (450 mL) pregnant with gold leached from a pressure oxidized ore slurry was transferred to a 1 L bottle where it was contacted with carbon for 30 minutes while the bottle was rolled. Sodium cyanide was added in an amount calculated to equal 4 moles NaCN per mole Au, two times the stoichiometric amount for formation of a gold cyanide complex. The bottles were rolled for 24 hours, the carbon was filtered, and the carbon and filtrate were assayed for gold. The results were as follows:

| Carbon concentration | Gold recovery |
|---|---|
| 1.0 g/L | 96.9% |
| 2.0 g/L | 98.4% |
| 4.0 g/L | 99.3% |

As various changes could be made in the above embodiments without departing from the scope of the invention, it is intended that all matter contained in the above description shall be interpreted as illustrative and not in a limiting sense.

What is claimed is:

1. A process for recovering gold from a refractory sulfidic and refractory carbonaceous auriferous ore having preg-robbing characteristics due to the presence of organic carbon comprising the steps of:
   forming an aqueous ore slurry comprising a refractory sulfidic and refractory carbonaceous ore having preg-robbing characteristics due to the presence of organic carbon;
   subjecting the ore slurry to pressure oxidation in an autoclave to produce an oxidized ore slurry;
   mixing the oxidized ore slurry with a lixiviant comprising a thiosulfate salt to form a mixture of oxidized ore slurry and lixiviant;
   leaching gold from the oxidized slurry in a stirred tank reactor system comprising between two and six agitated leach tanks by maintaining the mixture at a pH between 7 and 8.7 while agitating the mixture with a slurry residence time in each of said tanks of between about 30 and about 120 minutes to produce a leached slurry comprising a solid residue and a gold-bearing leachate; and
   recovering gold from the gold-bearing leachate.

2. The process of claim 1 wherein said gold is recovered from the gold-bearing leachate by zinc, copper, or iron cementation.

3. The process of claim 1 further comprising recovering ammonia from the leached slurry by adding a basic compound and aerating to drive off ammonia in an off-gas, scrubbing said off-gas to remove ammonia therefrom, and recycling ammonia to said leaching step.

4. The process of claim 1 comprising contacting the gold-bearing leachate with an adsorbent in order to load gold-thiosulfate complex from the leachate onto the adsorbent; and
   recovering gold from the gold-thiosulfate complex adsorbed onto the adsorbent.

5. The process of claim 1 comprising contacting the gold-bearing leachate with cyanide ion and an adsorbent in the presence of the solid residue to produce an aurocyanide complex which is loaded onto the adsorbent; and
   recovering gold from the aurocyanide complex adsorbed onto the adsorbent.

6. The process of claim 1 comprising separating the gold-bearing leachate from the solid residue;
   contacting the gold-bearing leachate with cyanide ion to produce an aurocyanide complex in solution;
   contacting the aurocyanide complex in solution with an adsorbent to load the aurocyanide complex onto the adsorbent; and
   recovering gold from the aurocyanide complex adsorbed onto the adsorbent.

7. The process of claim 1 comprising separating the gold-bearing leachate from the solid residue;
   contacting the gold-bearing leachate with cyanide ion and an adsorbent simultaneously to produce an aurocyanide complex which is loaded onto the adsorbent; and
   recovering gold from the aurocyanide complex adsorbed onto the adsorbent.

8. The process of claim 1 wherein said pressure oxidation occurs under acidic conditions to produce a pressure oxidized slurry having a pH of less than about 1 and raising said pH of the oxidized slurry to between 7 and 8.7 prior to mixing the oxidized ore slurry with the lixiviant.

9. The process of claim 1 comprising the addition of between about 50 and about 200 ppm chloride to the ore slurry prior to pressure oxidation.

10. A process for recovering gold from a refractory sulfidic and refractory carbonaceous auriferous ore having preg-robbing characteristics due to the presence of organic carbon comprising the steps of:
    forming an aqueous ore slurry comprising a refractory sulfidic and refractory carbonaceous ore having preg-robbing characteristics due to the presence of organic carbon;
    subjecting the ore slurry to pressure oxidation in an autoclave under neutral or alkaline conditions to produce an oxidized ore slurry having a pH in the range of between about 6 and 8;
    mixing the oxidized ore slurry with a lixiviant comprising a thiosulfate salt;
    leaching gold from the oxidized slurry in a stirred tank reactor system comprising between two and six agitated leach tanks by maintaining the mixture at a pH between 7 and 8.7 while agitating the mixture with a slurry residence time in each of said tanks of between about 30 and about 120 minutes to produce a leached slurry comprising a solid residue and a gold-bearing leachate; and
    recovering gold from the gold-bearing leachate.

11. The process of claim 10 wherein said gold is recovered from the gold-bearing leachate by cementation with zinc, copper, or iron.

12. The process of claim 10 comprising contacting the gold-bearing leachate with an adsorbent in order to load gold-thiosulfate complex from the leachate onto the adsorbent; and
    recovering gold from the gold-thiosulfate complex adsorbed onto the adsorbent.

13. The process of claim 10 comprising contacting the gold-bearing leachate with cyanide ion and an adsorbent in the presence of the solid residue to produce an aurocyanide complex which is loaded onto the adsorbent; and
    recovering gold from the aurocyanide complex adsorbed onto the adsorbent.

14. The process of claim 10 comprising separating the gold-bearing leachate from the solid residue;
    contacting the gold-bearing leachate with cyanide ion to produce an aurocyanide complex in solution;
    contacting the aurocyanide complex in solution with an adsorbent to load the aurocyanide complex onto the adsorbent; and
    recovering gold from the aurocyanide complex adsorbed onto the adsorbent.

15. The process of claim 10 comprising separating the gold-bearing leachate from the solid residue;
    contacting the gold-bearing leachate with cyanide ion and an adsorbent simultaneously to produce an aurocyanide complex which is loaded onto the adsorbent; and
    recovering gold from the aurocyanide complex adsorbed onto the adsorbent.

16. The process of claim 10 comprising adding between about 5 and 40 kg sodium hydroxide per ton of ore to the ore slurry to be subjected to pressure oxidation.

17. A process for recovering gold from a refractory sulfidic and refractory carbonaceous auriferous ore having preg-robbing characteristics due to the presence of organic carbon comprising the steps of:
    forming an aqueous slurry comprising a refractory sulfidic and refractory carbonaceous ore having preg-robbing characteristics due to the presence of organic carbon;
    subjecting the ore slurry to pressure oxidation for between about 30 and about 100 minutes in an autoclave at a temperature in the range of between about 185° and 235° C. and an oxygen overpressure of at least about 20 psi to produce an oxidized ore slurry;

cooling the oxidized ore slurry to a temperature between about 40° C. and about 55° C.;

adjusting the pH of the oxidized slurry to between 7 and 8.7;

mixing the oxidized slurry with a lixiviant comprising a thiosulfate salt in a proportion of between about 0.025M and 0.1M thiosulfate ion, copper in a proportion of between about 50 and 100 ppm, and sulfite in a proportion of at least about 0.001M, while maintaining the pH between 7 and 8.7;

maintaining the oxidized slurry and lixiviant at a temperature in the range of between 40° C. and 55° C. while agitating the slurry in a stirred tank reactor system comprising between two and six mechanically agitated leach tanks with a residence time of the slurry in each tank of between about 30 and 120 minutes to produce a leached slurry comprising a solid residue and a gold-bearing leachate; and recovering gold from the gold-bearing leachate.

18. The process of claim 17 wherein said gold is recovered from the gold-bearing leachate by cementation with zinc, copper, or iron.

19. The process of claim 17 comprising contacting the gold-bearing leachate with an adsorbent in order to load gold-thiosulfate complex from the leachate onto the adsorbent; and recovering gold from the gold-thiosulfate complex adsorbed onto the adsorbent.

20. The process of claim 17 comprising contacting the gold-bearing leachate with cyanide ion and an adsorbent in the presence of the solid residue to produce an aurocyanide complex which is loaded onto the adsorbent; and recovering gold from the aurocyanide complex adsorbed onto the adsorbent.

21. The process of claim 17 comprising separating the gold-bearing leachate from the solid residue;

contacting the gold-bearing leachate with cyanide ion to produce an aurocyanide complex in solution;

contacting the aurocyanide complex in solution with an adsorbent to load the aurocyanide complex onto the adsorbent; and recovering gold from the aurocyanide complex adsorbed onto the adsorbent.

22. The process of claim 17 comprising separating the gold-bearing leachate from the solid residue;

contacting the gold-bearing leachate with cyanide ion and an adsorbent simultaneously to produce an aurocyanide complex which is loaded onto the adsorbent; and recovering gold from the aurocyanide complex adsorbed onto the adsorbent.

* * * * *